(12) United States Patent
Podgorski et al.

(10) Patent No.: US 9,068,511 B2
(45) Date of Patent: Jun. 30, 2015

(54) PRESSURE REGULATING VALVE

(75) Inventors: David J. Podgorski, Suffield, CT (US); Aaron Rickis, Feeding Hills, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 682 days.

(21) Appl. No.: 13/456,468

(22) Filed: Apr. 26, 2012

(65) Prior Publication Data

US 2013/0283763 A1  Oct. 31, 2013

(51) Int. Cl.
*F16K 11/07* (2006.01)
*F02C 7/232* (2006.01)
*G05D 7/06* (2006.01)

(52) U.S. Cl.
CPC ............... *F02C 7/232* (2013.01); *G05D 7/0635* (2013.01); *F16K 11/07* (2013.01)

(58) Field of Classification Search
CPC ............ F16K 11/07; F02C 7/232; F02C 9/28; G05D 7/0635
USPC ............... 251/205–206, 210–211; 137/15.21, 137/625.3, 625.38
See application file for complete search history.

(56) References Cited

U.S. PATENT DOCUMENTS

| | | | | |
|---|---|---|---|---|
| 2,836,198 A | * | 5/1958 | McNeill | 137/625.39 |
| 2,964,023 A | * | 12/1960 | Meulendyk | 137/625.12 |
| 4,109,683 A | * | 8/1978 | Strache | 137/625.3 |
| 4,215,723 A | | 8/1980 | Ichiryu et al. | |
| 4,325,412 A | * | 4/1982 | Hayner | 137/625.65 |
| 4,637,420 A | | 1/1987 | Dyer | |
| 5,070,898 A | | 12/1991 | Jagodzinski et al. | |
| 6,397,890 B1 | * | 6/2002 | Mickelson et al. | 137/625.34 |
| 6,401,446 B1 | | 6/2002 | Gibbons | |
| 6,666,015 B2 | | 12/2003 | Dyer | |
| 2004/0025492 A1 | | 2/2004 | Griffiths et al. | |
| 2007/0199601 A1 | * | 8/2007 | Imhof | 137/625.64 |
| 2008/0035225 A1 | * | 2/2008 | Tackes et al. | 137/625.35 |
| 2008/0296403 A1 | | 12/2008 | Futa, Jr. et al. | |
| 2011/0023982 A1 | | 2/2011 | Griffiths | |

OTHER PUBLICATIONS

Ni, et al., Compensation Force CFD Analysis of Pressure Regulating Valve Applied in FMU of Engine and System Controls, 2011-01-2641, Copyright 2011 SAE International, 7 pages.
Anderson, et al., Mathematical Modelin of a Two Spool Flow Control Servolvalue Using a Pressure Control Pilot, Transactions of the ASME, Copyright 2002 by ASME, vol. 124, Sep. 2002, pp. 420-427.

* cited by examiner

*Primary Examiner* — John Bastianelli
(74) *Attorney, Agent, or Firm* — Cantor Colburn LLP

(57) ABSTRACT

A pressure regulating valve assembly includes a pressure regulating valve sleeve and a pressure regulating valve spool. The pressure regulating valve sleeve includes a first window set and a second window set. The pressure regulating valve spool includes a first cylindrical portion, a second cylindrical portion, and a third cylindrical portion formed between the first and second cylindrical portions. The pressure regulating valve spool also includes an angled bucket formed on the first cylindrical portion having a high gain portion of a first width, a low gain portion of a second width, and a ratio of the first width to the second width between 1.44 and 1.47. The pressure regulating valve spool further includes an angled outlet surface. The angled bucket is configured to align with the first window set and the angled outlet surface is configured to align with the second window set.

20 Claims, 5 Drawing Sheets

PRESSURE REGULATING VALVE

BACKGROUND OF THE INVENTION

The present invention is related to fuel flow control, and more specifically to a pressure regulating valve.

Fuel flow control in systems such as gas turbines includes controlling and maintaining pressures within a fuel control housing of a fuel control. To control and maintain pressures within the fuel control housing, often the fuel flow is increased and decreased as well as diverted via a combination of control valves. A displacement pump pressurizes fuel prior to its metering and subsequent delivery to an engine. The displacement pump is typically sized to ensure an excess flow capacity at all possible operating conditions. The output of the pump is delivered to a fuel metering valve which, in conjunction with a bypassing, pressure regulating valve (PRV), meters the rate of fuel burn flow to the engine. Proper control of a fuel system is based on the consistent operation of all valves within the fuel system. Without consistent valve operation, the fuel system may become unpredictable.

BRIEF DESCRIPTION OF THE INVENTION

Exemplary embodiments include a pressure regulating valve assembly that includes a pressure regulating valve sleeve and a pressure regulating valve spool configured to move bi-directionally along a longitudinal axis of the pressure regulating valve sleeve. The pressure regulating valve sleeve includes a first window set and a second window set. The pressure regulating valve spool includes a first cylindrical portion, a second cylindrical portion, and a third cylindrical portion formed between the first and second cylindrical portions. The pressure regulating valve spool also includes an angled bucket formed on the first cylindrical portion having a high gain portion of a first width, a low gain portion of a second width, and a ratio of the first width to the second width between 1.44 and 1.47. The pressure regulating valve spool further includes an angled outlet surface spanning between the second cylindrical portion and the third cylindrical portion. The angled bucket is configured to align with the first window set and the angled outlet surface is configured to align with the second window set.

Additional exemplary embodiments include a fuel control. The fuel control includes a metering valve section configured to meter a fuel burn flow and a pressure regulating valve section configured to control a metered pressure of a metering valve section. The pressure regulating valve section includes a pressure regulating valve assembly that includes a pressure regulating valve sleeve and a pressure regulating valve spool configured to move bi-directionally along a longitudinal axis of the pressure regulating valve sleeve. The pressure regulating valve sleeve includes a first window set and a second window set. The pressure regulating valve spool includes a first cylindrical portion, a second cylindrical portion, and a third cylindrical portion formed between the first and second cylindrical portions. The pressure regulating valve spool also includes an angled bucket formed on the first cylindrical portion having a high gain portion of a first width, a low gain portion of a second width, and a ratio of the first width to the second width between 1.44 and 1.47. The pressure regulating valve spool further includes an angled outlet surface spanning between the second cylindrical portion and the third cylindrical portion. The angled bucket is configured to align with the first window set and the angled outlet surface is configured to align with the second window set.

Further exemplary embodiments include a method of installing a pressure regulating valve assembly in a fuel control. The method includes inserting a pressure regulating valve sleeve into a pressure regulating valve section of a fuel control housing. The pressure regulating valve sleeve includes a first window set, a second window set, and a limiting lip. The method further includes arranging a pressure regulating valve spool within the pressure regulating valve sleeve. The pressure regulating valve spool includes a limiting lip, a first cylindrical portion, a second cylindrical portion, a third cylindrical portion formed between the first and second cylindrical portions. The first cylindrical portion and the second cylindrical portion have a substantially equal first diameter, the third cylindrical portion has a second diameter, and a ratio of the first diameter to the second diameter is between 1.60 and 1.65. The pressure regulating valve spool is arranged to establish a diametral clearance of 0.0003 and 0.0005 inches (0.000762-0.00127 cm) between an inner diameter of the pressure regulating valve sleeve and the first diameter. The method also includes coupling a resilient member to the pressure regulating valve spool in the pressure regulating valve section of the fuel control housing, where the resilient member forces the limiting lip of the pressure regulating valve spool into contact with the limiting lip of the pressure regulating valve sleeve.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
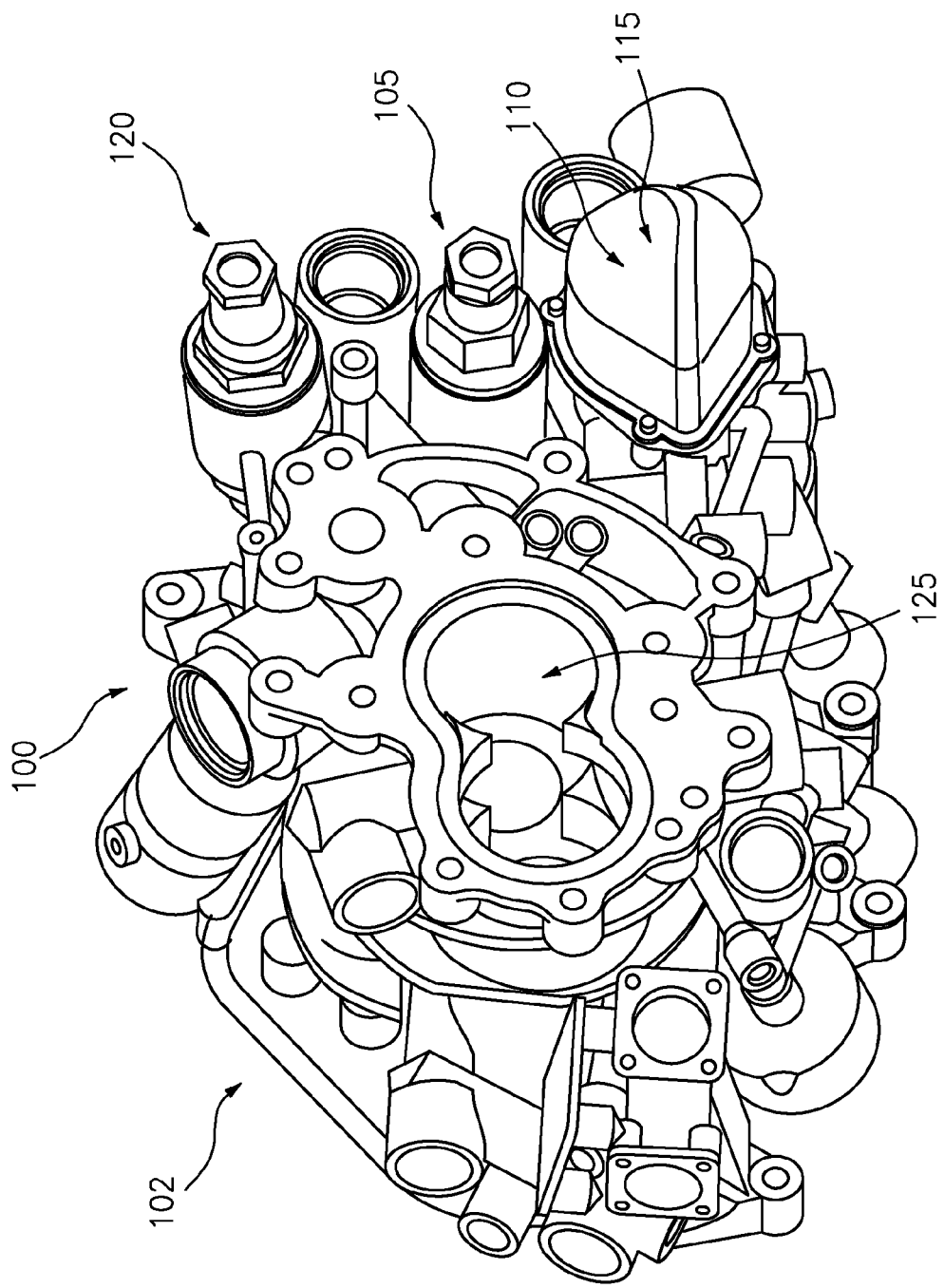
FIG. 1 schematically illustrates a perspective view of a fuel control housing portion for regulating fuel flow.

FIG. 1 schematically illustrates a perspective view of a fuel control housing portion 100 of a fuel control 102 for regulating fuel flow for systems such as aircraft gas turbine engines. In one embodiment, the fuel control housing portion 100 includes a pressure regulating valve section 105, a metering valve section 110, a containment housing section 115 that is generally adjacent to the metering valve section 110, and a servo minimum pressure valve section 120. Other valves, control and feedback features (not depicted) may also be included in the fuel control housing portion 100 or in another portion (not depicted) of the fuel control 102. Fuel flowing into the fuel control housing portion 100 is pressurized in a pump section 125. Pressurized flow is metered in metering valve section 110 before being output as a fuel burn flow at a metered pressure. The pressure regulating valve section 105 sets and controls the metered pressure of the metering valve section 110. The fuel control 102 can also provide fluid pressure for actuators (not depicted), where the servo minimum pressure valve section 120 establishes a minimum pressure and discharges excess flow to the pressure regulating valve section 105.

Figure 2:
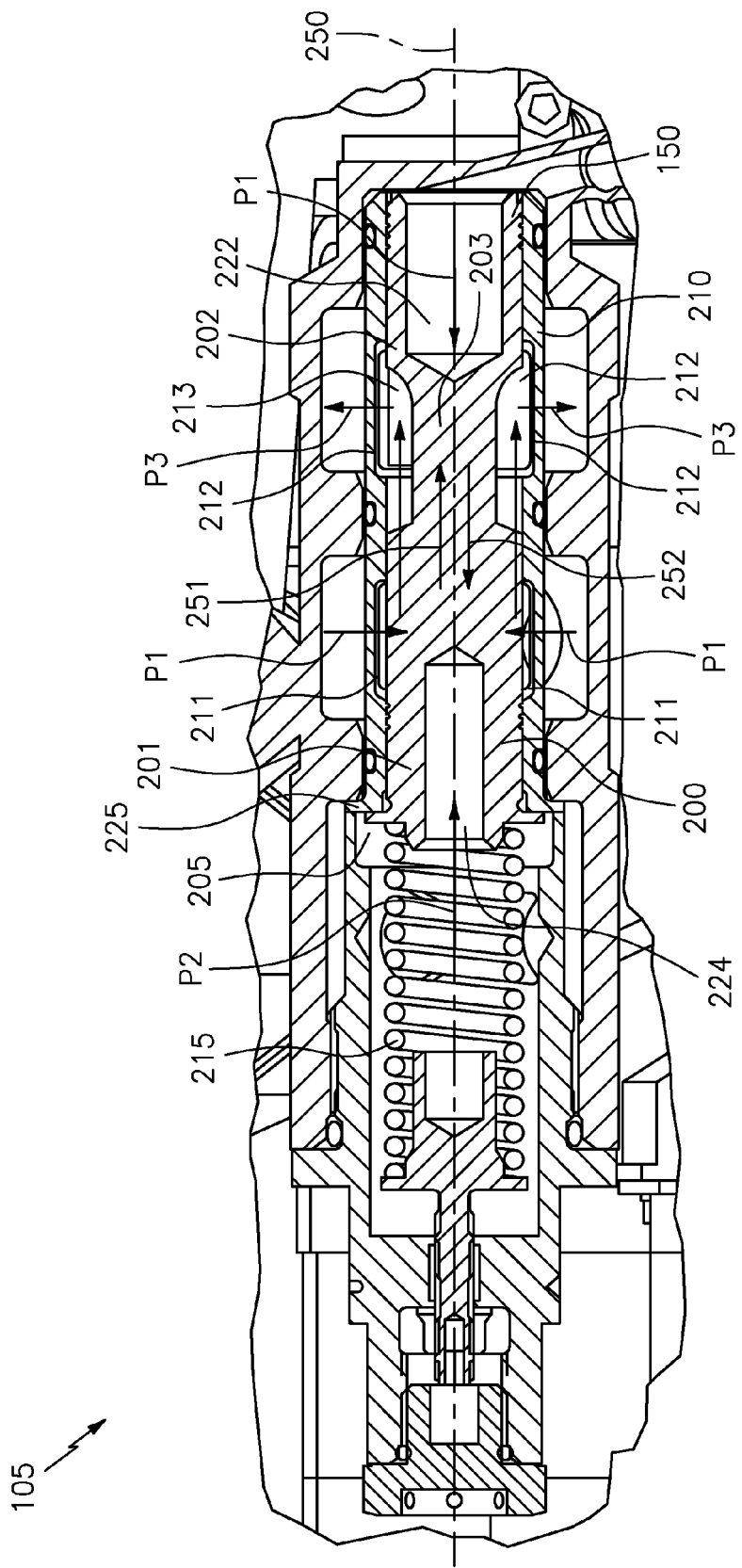
FIG. 2 schematically illustrates a cross-sectional view of a pressure regulating valve section of the fuel control housing portion of FIG. 1.
Figure 4:
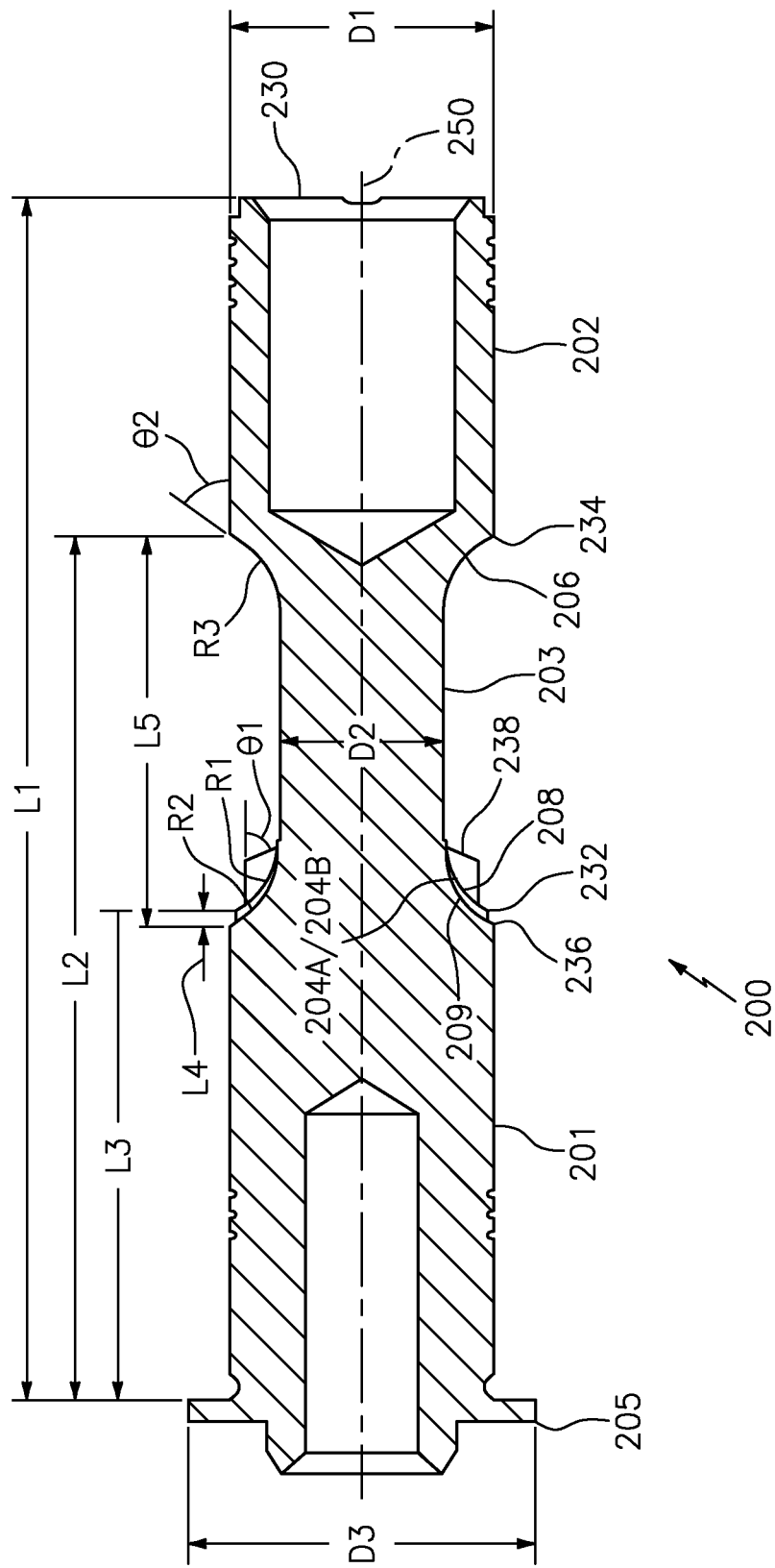
FIG. 4 schematically illustrates a cross-sectional view of the pressure regulating valve spool of FIG. 2.

FIG. 2 schematically illustrates a cross-sectional view of the pressure regulating valve section 105 of FIG. 1 including a pressure regulating valve assembly 150. The pressure regulating valve assembly 150 includes a pressure regulating valve spool 200 arranged within a pressure regulating valve sleeve 210. In one embodiment, the pressure regulating valve spool 200 includes a first cylindrical portion 201 and a second cylindrical portion 202 having a substantially equal outer diameter D1 as depicted in FIG. 4. The pressure regulating valve spool 200 further includes a third cylindrical portion 203 formed between of the first and second cylindrical portions 201, 202, and having an outer diameter D2 as depicted in FIG. 4. In an embodiment, D1 is at least 0.6495 inches (1.650 cm), D2 is about 0.400 inches (1.016 cm), and a ratio of D1 to D2 is between 1.60 and 1.65. The differential in diameter between the first and second cylindrical portions 201, 202 and the third cylindrical portion 203 forms a space 213 when the pressure regulating valve spool 200 and the pressure regulating valve sleeve 210 are concentrically arranged.

In one embodiment, the pressure regulating valve sleeve 210 includes first window set 211 and second window set 212. When the pressure regulating valve spool 200 is positioned within the pressure regulating valve sleeve 210 such that at least a portion of the space 213 aligns with the first and second window sets 211 and 212, a fluid, such as fuel, can flow at an inlet pressure P1 at first window set 211 through space 213 and out of second window set 212 at a discharge pressure P3. In operation, the pressure regulating valve spool 200 is immersed in fuel, where a difference in fuel pressure forces the pressure regulating valve spool 200 to move bi-directionally along longitudinal axis 250 as indicated by arrows 251, 252. The pressure regulating valve sleeve 210 remains fixed with respect to the pressure regulating valve section 105.

The pressure regulating valve spool 200 is coupled to a resilient member 215 (e.g., a spring). The force of inlet pressure P1 at spool end 222 must be greater than the combined force of metered pressure P2 at spool end 224 plus a spring load force of the resilient member 215 to move the pressure regulating valve spool 200 from a closed position to an open position. In the closed position, the space 213 does not overlap the first and second window sets 211 and 212. In the open position, the space 213 overlaps first and second window sets 211 and 212 such that fuel can flow at inlet pressure P1 through first window set 211 through space 213 and out of second window set 212 at discharge pressure P3. Movement of the pressure regulating valve spool 200 within the pressure regulating valve sleeve 210 in the direction of arrow 251 may be limited by a limiting lip 205 of pressure regulating valve spool 200 and a limiting lip 225 of pressure regulating valve sleeve 210.

Figure 3:
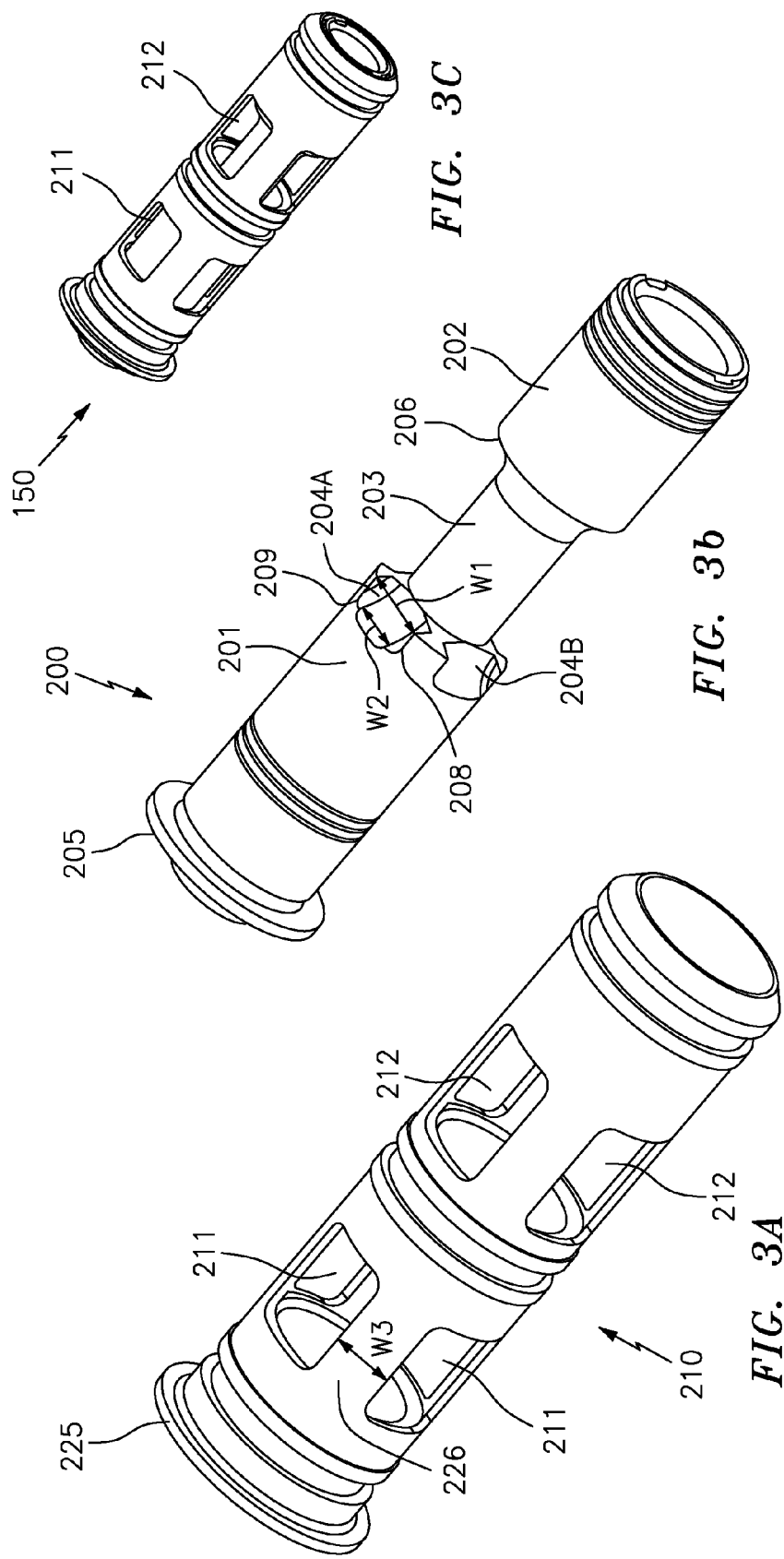
FIG. 3 illustrates a perspective view of a pressure regulating valve spool and a pressure regulating valve sleeve of FIG. 2.

FIG. 3 illustrates a perspective view of the pressure regulating valve spool 200 in isolation and the pressure regulating valve sleeve 210 in isolation. FIG. 3 further illustrates a perspective view of the pressure regulating valve spool 200 and the pressure regulating valve sleeve 210 in a concentric arrangement. The pressure regulating valve spool 200 further includes angled buckets 204A and 204B formed on the first cylindrical portion 201 adjacent to the third cylindrical portion 203. In an embodiment, there are two angled buckets 204A equally spaced about the first cylindrical portion 201 and two angled buckets 204B equally spaced about the first cylindrical portion 201. The pressure regulating valve spool 200 also includes an angled outlet surface 206 spanning between the second cylindrical portion 202 and the third cylindrical portion 203.

As previously described, as the first window set 211 aligns with the space 213, fuel flows into the space 213. The shape of the angled buckets 204A and 204B provides a controlled flow of the fuel into the space 213. The angled outlet surface 206 also provides a controlled fuel flow out of the space 213 through the second window set 212. As such, the pressure regulating valve spool 200 and the pressure regulating valve sleeve 210 operate together to bypass excess flow and set a fixed pressure downstream to the metering valve section 110 of FIG. 1 to meet system accuracy. The pressure regulating valve spool 200 and the pressure regulating valve sleeve 210 bypass the fuel flow that is not sent to the metering valve section 110, while at the same time holding a constant pressure across the metering valve section 110. The angled buckets 204A and 204B and the angled outlet surface 206 also provide balance to flow forces with the spring load of resilient member 215.

Each of the angled buckets 204A and 204B has a width W1 of about 0.32 inches (0.81 cm). Angled buckets 204A include a high gain portion 208 having width W1 and a low gain portion 209 having a width W2, where W2 is about 0.22 inches (0.56 cm). In an embodiment, the angled buckets 204B are equivalent to the high gain portion 208 of the angled buckets 204A, having a substantially equal width W1. A ratio of W1 to W2 is between 1.44 and 1.47. Struts 226 are located between adjacent windows in the first window set 211. Each of the struts 226 has a width W3 of about 0.30 inches (0.76 cm), such that W3 is less than W1.

FIG. 4 depicts additional details of the pressure regulating valve spool 200 in a cross-sectional view according to an embodiment. The pressure regulating valve spool 200 has a length L1 from limiting lip 205 to end 230 of about 2.93 inches (7.45 cm) and a length L2 from limiting lip 205 to a break edge 234 of second cylindrical portion 202 of about 2.11 inches (5.36 cm). The pressure regulating valve spool 200 has a length L3 from limiting lip 205 to a high gain bucket edge 232 of about 1.186 inches (3.0124 cm), where the high gain bucket edge 232 is an edge of a high gain portion 208 of angled bucket 204A. The high gain bucket edge 232 may be axially aligned with an edge of angled bucket 204B, such that length L3 is substantially equal for angled buckets 204A and 204B. A ratio of L2 to L1 is between 0.717 and 0.723. A ratio of L3 to L1 is between 0.403 and 0.564. The limiting lip 205 has a diameter D3 of about 0.850 inches (2.159 cm).

The high gain portion 208 has a radius R1 of about 0.197 inches (0.500 cm). The low gain portion 209 has a radius R2, which may also be about 0.197 inches (0.500 cm) but offset by a length L4 of 0.025 inches (0.0635 cm) from the high gain bucket edge 232 to low gain bucket edge 236. A maximum passage length L5 between low gain bucket edge 236 and break edge 234 is about 0.951 inches (2.416 cm). The ratio of radius R2 to length L5 is between 0.197 and 0.217. The angled outlet surface 206 has a radius R3 of about 0.180 inches (0.457 cm).

A portion of angled buckets 204A and 204B is formed at an angled inlet surface 238 that transitions between the first cylindrical portion 201 and the third cylindrical portion 203. The angled inlet surface 238 is formed at an angle theta1 of about 69 degrees. The angled outlet surface 206 is formed at an angle theta2 of about 56 degrees. A ratio of theta1 to theta2 is between 1.19 and 1.28.

Figure 5:
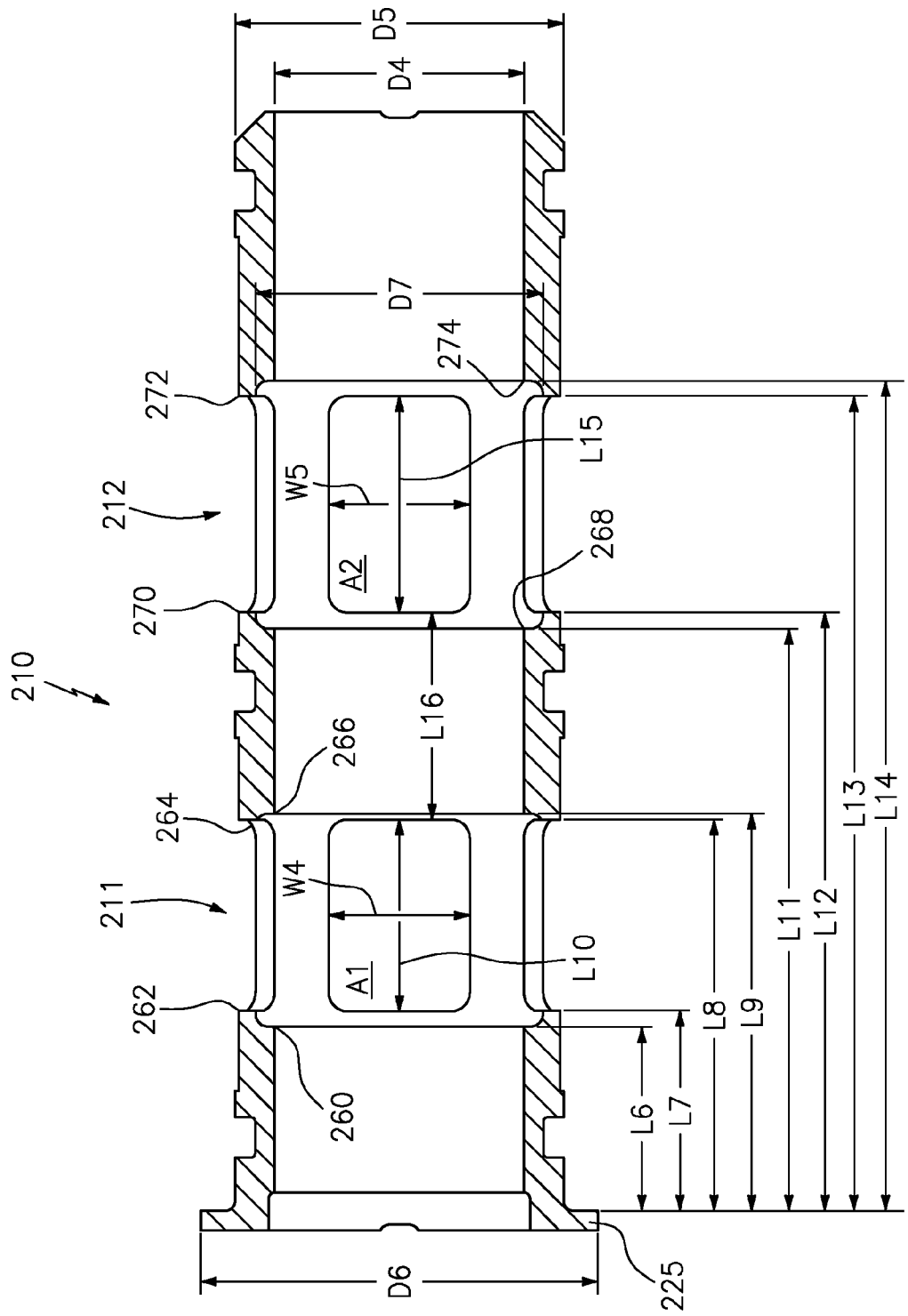
FIG. 5 schematically illustrates a cross-sectional view of the pressure regulating valve sleeve of FIG. 2.

FIG. 5 depicts further details of the pressure regulating valve sleeve 210 in a cross-sectional view according to an embodiment. The pressure regulating valve sleeve 210 has an internal diameter D4 of a maximum of 0.6525 inches (1.6574 cm). A diametral clearance of 0.0003-0.0005 inches (0.000762-0.00127 cm) is maintained between internal diameter D4 of pressure regulating valve sleeve 210 and outer diameter D1 of pressure regulating valve spool 200 of FIG. 4 for each matched set of the pressure regulating valve spool 200 and the pressure regulating valve sleeve 210. An outer diameter D5 of pressure regulating valve sleeve 210 is about 0.8605 inches (2.186 cm). The limiting lip 225 of pressure regulating valve sleeve 210 has a diameter D6 of about 1.040 inches (2.642 cm). An internal diameter D7 between opposed windows in the first and second window sets 211 and 212 is about 0.754 inches (1.92 cm). A difference in diameter between diameters D7 and D4 forms annular circulation cavities between the first and second window sets 211 and 212 and the pressure regulating valve spool 200 of FIG. 4.

A first interior edge 260 of the first window set 211 is located at a length L6 of about 0.485 inches (1.23 cm) from the limiting lip 225. A first exterior edge 262 of the first window set 211 is located at a length L7 of about 0.526 inches (1.34 cm) from the limiting lip 225. A second exterior edge 264 of the first window set 211 is located at a length L8 of about 1.03 inches (2.62 cm) from the limiting lip 225. A second interior edge 266 of the first window set 211 is located at a length L9 of about 1.045 inches (2.65 cm) from the limiting lip 225. Each window in the first window set 211 has a length L10 of about 0.504 inches (1.28 cm) and a width W4 of about 0.375 inches (0.95 cm).

A first interior edge 268 of the second window set 212 is located at a length L11 of about 1.53 inches (3.89 cm) from the limiting lip 225. A first exterior edge 270 of the second window set 212 is located at a length L12 of about 1.571 inches (3.99 cm) from the limiting lip 225. A second exterior edge 272 of the second window set 212 is located at a length L13 of about 2.138 inches (5.43 cm) from the limiting lip 225. A second interior edge 274 of the second window set 212 is located at a length L14 of about 2.179 inches (5.53 cm) from the limiting lip 225. Each window in the second window set 212 has a length L15 of about 0.567 inches (1.44 cm) and a width W5 of about 0.375 inches (0.95 cm).

The first window set 211 and the second window set 212 are axially separated by a length L16 of about 0.541 inches (1.37 cm). An area of a window A1 of the first window set 211 is about 0.189 inches$^2$ (1.22 cm$^2$). An area of a window A2 of the second window set 212 is about 0.213 inches$^2$ (1.37 cm$^2$). A ratio of A2 to A1 is about 1.125.

In an embodiment, the pressure regulating valve assembly 150 of FIG. 2 can be installed in fuel control 102 of FIG. 1 by inserting pressure regulating valve sleeve 210 into pressure regulating valve section 105 of fuel control housing portion 100. Pressure regulating valve spool 200 is arranged within the pressure regulating valve sleeve 210 to establish a diametral clearance of 0.0003 and 0.0005 inches (0.000762-0.00127 cm) between the internal diameter D4 of the pressure regulating valve sleeve 210 and the outer diameter D1 of the pressure regulating valve spool 200. Resilient member 215 is coupled to pressure regulating valve spool 200 in the pressure regulating valve section 105 of the fuel control housing portion 100, forcing the limiting lip 205 of the pressure regulating valve spool 200 into contact with the limiting lip 225 of the pressure regulating valve sleeve 210 as an initial spring load force to be overcome for the pressure regulating valve spool 200 to move along longitudinal axis 250.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of installing a pressure regulating valve assembly in a fuel control, the method comprising:
   inserting a pressure regulating valve sleeve into a pressure regulating valve section of a fuel control housing, the pressure regulating valve sleeve comprising a first window set, a second window set, and a limiting lip;
   arranging a pressure regulating valve spool within the pressure regulating valve sleeve, the pressure regulating valve spool comprising a limiting lip, a first cylindrical portion, a second cylindrical portion, a third cylindrical portion formed between the first and second cylindrical portions, wherein the first cylindrical portion and the second cylindrical portion have a substantially equal first diameter, the third cylindrical portion has a second diameter, and a ratio of the first diameter to the second diameter is between 1.60 and 1.65, and the pressure regulating valve spool is arranged to establish a diametral clearance of 0.0003 and 0.0005 inches (0.000762-0.00127 cm) between an inner diameter of the pressure regulating valve sleeve and the first diameter; and
   coupling a resilient member to the pressure regulating valve spool in the pressure regulating valve section of the fuel control housing, the resilient member forcing the limiting lip of the pressure regulating valve spool into contact with the limiting lip of the pressure regulating valve sleeve.

2. A pressure regulating valve assembly comprising:
   a pressure regulating valve sleeve comprising a first window set and a second window set; and
   a pressure regulating valve spool configured to move bi-directionally along a longitudinal axis of the pressure regulating valve sleeve, the pressure regulating valve spool comprising:
      a first cylindrical portion, a second cylindrical portion, and a third cylindrical portion formed between the first and second cylindrical portions;
      an angled bucket formed on the first cylindrical portion having a high gain portion of a first width, a low gain portion of a second width, and a ratio of the first width to the second width between 1.44 and 1.47; and
      an angled outlet surface spanning between the second cylindrical portion and the third cylindrical portion, wherein the angled bucket is configured to align with the first window set and the angled outlet surface is configured to align with the second window set.

3. The pressure regulating valve assembly of claim 2, wherein the first cylindrical portion and the second cylindrical portion have a substantially equal first diameter, the third cylindrical portion has a second diameter, and a ratio of the first diameter to the second diameter is between 1.60 and 1.65.

4. The pressure regulating valve assembly of claim 3, wherein the pressure regulating valve sleeve has an internal diameter between 0.0003 and 0.0005 inches (0.000762-0.00127 cm) greater than the first diameter.

5. The pressure regulating valve assembly of claim 2, further comprising a strut located between adjacent windows in the first window set, the strut having a third width less than the first width.

6. The pressure regulating valve assembly of claim 2, further comprising a second angled bucket formed on the first cylindrical portion, the second angled bucket having a width substantially equal to the first width.

7. The pressure regulating valve assembly of claim 2, wherein the angled outlet surface is formed at an angle of about 56 degrees.

8. The pressure regulating valve assembly of claim 2, wherein a ratio of a radius of the low gain portion of the angled bucket to a passage length defined between a low gain bucket edge and a break edge of the second cylindrical portion is between 0.197 and 0.217.

9. The pressure regulating valve assembly of claim 8, wherein the passage length is about 0.951 inches (2.416 cm), and the first window set and the second window set are axially separated by a length of about 0.541 inches (1.37 cm).

10. The pressure regulating valve assembly of claim 2, wherein a ratio of an area of a window of the second window set to an area of a window of the first window set is about 1.125.

11. The pressure regulating valve assembly of claim 2, further comprising a limiting lip formed on the pressure regulating valve spool and a limiting lip formed on the pressure regulating valve sleeve, the limiting lips configured to limit movement of the pressure regulating valve spool relative to the pressure regulating valve sleeve along the longitudinal axis.

12. A fuel control, comprising:
a metering valve section configured to meter a fuel burn flow; and
a pressure regulating valve section configured to control a metered pressure of a metering valve section, the pressure regulating valve section including a pressure regulating valve assembly comprising:
a pressure regulating valve sleeve comprising a first window set and a second window set; and
a pressure regulating valve spool configured to move bi-directionally along a longitudinal axis of the pressure regulating valve sleeve, the pressure regulating valve spool comprising:
a first cylindrical portion, a second cylindrical portion, and a third cylindrical portion formed between the first and second cylindrical portions;
an angled bucket formed on the first cylindrical portion having a high gain portion of a first width, a low gain portion of a second width, and a ratio of the first width to the second width between 1.44 and 1.47; and
an angled outlet surface spanning between the second cylindrical portion and the third cylindrical portion, wherein the angled bucket is configured to align with the first window set and the angled outlet surface is configured to align with the second window set.

13. The fuel control of claim 12, wherein the first cylindrical portion and the second cylindrical portion have a substantially equal first diameter, the third cylindrical portion has a second diameter, and a ratio of the first diameter to the second diameter is between 1.60 and 1.65.

14. The fuel control of claim 13, wherein the pressure regulating valve sleeve has an internal diameter between 0.0003 and 0.0005 inches (0.000762-0.00127 cm) greater than the first diameter.

15. The fuel control of claim 12, further comprising a strut located between adjacent windows in the first window set, the strut having a third width less than the first width.

16. The fuel control of claim 12, further comprising a second angled bucket formed on the first cylindrical portion, the second angled bucket having a width substantially equal to the first width.

17. The fuel control of claim 12, wherein the angled outlet surface is formed at an angle of about 56 degrees.

18. The fuel control of claim 12, wherein a ratio of a radius of the low gain portion of the angled bucket to a passage length defined between a low gain bucket edge and a break edge of the second cylindrical portion is between 0.197 and 0.217.

19. The fuel control of claim 17, wherein the passage length is about 0.951 inches (2.416 cm), and the first window set and the second window set are separated by a length of about 0.541 inches (1.37 cm).

20. The fuel control of claim 12, wherein a ratio of an area of a window of the second window set to an area of a window of the first window set is about 1.125.

* * * * *